US 10,615,717 B1

United States Patent
Wu et al.

(10) Patent No.: US 10,615,717 B1
(45) Date of Patent: Apr. 7, 2020

(54) SINGLE PHASE CONTROLLING METHOD AND THREE PHASE INVERTING DEVICE USING THE SAME

(71) Applicant: NATIONAL TSING HUA UNIVERSITY, Hsinchu (TW)

(72) Inventors: Tsai-Fu Wu, Chiayi County (TW); Ying-Yi Jhang, Taichung (TW); Yen-Hsiang Huang, Taichung (TW); Ling-Chia Yu, New Taipei (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/540,032

(22) Filed: Aug. 13, 2019

(30) Foreign Application Priority Data

Jan. 2, 2019 (TW) .............................. 108100101 A

(51) Int. Cl.
H02M 7/5387 (2007.01)
(52) U.S. Cl.
CPC ............................. H02M 7/53871 (2013.01)
(58) Field of Classification Search
CPC ... H02M 7/53871; H02M 2007/53876; H02M 2007/53878
See application file for complete search history.

(56) References Cited

U.S. PATENT DOCUMENTS

| | | | | |
|---|---|---|---|---|
| 2008/0013351 | A1* | 1/2008 | Alexander | .......... H02M 3/1582 363/123 |
| 2012/0014151 | A1* | 1/2012 | Alexander | ............ H02M 5/225 363/123 |
| 2019/0173411 | A1* | 6/2019 | Jung | ................. H02M 7/53871 |
| 2019/0207511 | A1* | 7/2019 | Ordasi | ................... B62D 5/046 |

* cited by examiner

*Primary Examiner* — Jue Zhang
(74) *Attorney, Agent, or Firm* — CKC & Partners Co., LLC

(57) ABSTRACT

A three phase inverting device includes a three phase inverter module and a three phase filter module. The three phase inverter module includes a plurality of switches, each two switches are connected for forming a bridge arm, an input end of each of the bridge arm are coupled for forming a DC end, the DC end is connected to a DC load. The three phase filter module is connected to the three phase inverter module, wherein the three phase filter module includes a plurality of inductances and a plurality of capacitances, the inductances are connected at one side of the capacitances, a portion of the capacitances are connected to a output end of each of the bridge arm of the three phase inverter module, a portion of the inductances are connected to an AC end.

6 Claims, 7 Drawing Sheets input a DC current into a DC end of the three phase inverting device — S101 perform a de-coupling procedure to calculate a switching duty ratio using an average value of a voltage between the DC end and a ground of a AC end of the three phase inverting device and generating an electric output of a single phase circuit in accordance with the average value of the voltage and the switching duty ratio — S102 perform a dividing procedure to divide the electric output of the single phase circuit into two current variations of an inverting end of the three phase inverting device, wherein the two current variations are corresponded to an excitation state and a demagnetization state respectively — S103 perform an integrating procedure to integrate the two current variations corresponded to the excitation state and the demagnetization state for obtaining another switching duty ratio on a next duty of the three phase switch — S104

PF=1

PF=0
(the current lags the voltage)

PF=-1

PF=0
(the current leads the voltage)

SINGLE PHASE CONTROLLING METHOD AND THREE PHASE INVERTING DEVICE USING THE SAME

RELATED APPLICATIONS

This application claims priority to Taiwan Application Serial Number 108100101, filed Jan. 2, 2019, which is herein incorporated by reference.

BACKGROUND

Technical Field

The present disclosure relates to a controlling method and an inverting device using the same. More particularly, the present disclosure relates to a single phase controlling method and a three phase inverting device using the same.

Description of Related Art

The demand on the renewable energy is increasing owing to the issue of the global warming becomes more serious. An inverter parallel system has become a mainstream owing to the continuously developed technologies of the renewable energy (e.g. a solar power generation system). The power of the inverter parallel system can be enhanced by connecting a plurality of inverter modules in parallel and is increased with the quantity of the inverter modules. Furthermore, when one of the inverter modules is failed, the other inverter modules can be used as a substitute, thereby achieving a high reliability of the system. The requirement on the voltage and current resistance is also lower in this kind of inverter parallel system. When comparing a three phase inverter with three single phase inverters, the three phase inverter has a constant instantaneous power, and a low voltage ripple can be obtained using a low capacitance value. Furthermore, smaller quantity of the switch can be used, thereby reducing power loss and the circuit manufacturing cost.

It is important to increase a current sharing in a single phase and reduce circulating currents between each phase of the inverter parallel system. The common methods for achieving the current sharing include a centralized controlling method, a client-server controlling method, a circular track controlling method, a distributed logic controlling method and a wireless automatic controlling method, etc. The common methods for reducing the circulating currents include a hardware reducing method, a synchronous controlling method and a switch modulating method, etc. However, since the three phases are coupled with each other, the methods for controlling the current sharing and the circulating currents are complicated, thus leading to resource consumption. Therefore, there is a need to develop a method that can effectively control the current-sharing and the circulating currents.

SUMMARY

According to one aspect of the present disclosure, a single phase controlling method is provided. The single phase controlling method is applied to a three phase inverting device, the three phase inverting device includes a three phase switch, the single phase controlling method includes: inputting a DC current into a DC end of the three phase inverting device; performing a de-coupling procedure to calculate a switching duty ratio using an average value of a voltage between the DC end and a ground of an AC end of the three phase inverting device and generating an electric output of a single phase circuit in accordance with the average value of the voltage and the switching duty ratio; performing a dividing procedure to divide the electric output of the single phase circuit into two current variations of an inverting end of the three phase inverting device, wherein the two current variations are corresponded to an excitation state and a demagnetization state respectively; and performing an integrating procedure to integrate the two current variations corresponded to the excitation state and the demagnetization state for obtaining another switching duty ratio on a next duty of the three phase switch.

According to another aspect of the present disclosure, a three phase inverting device is provided. The three phase inverting device includes a three phase inverter module and a three phase filter module. The three phase inverter module includes a plurality of switches, each two of the switches are connected for forming a bridge arm, an input end of each of the bridge arm are coupled for forming a DC end, the DC end is connected to a DC load. The three phase filter module is connected to the three phase inverter module, wherein the three phase filter module includes a plurality of inductances and a plurality of capacitances, the inductances are connected at one side of the capacitances, a portion of the capacitances are connected to a output end of each of the bridge arm of the three phase inverter module, a portion of the inductances are connected to an AC end.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
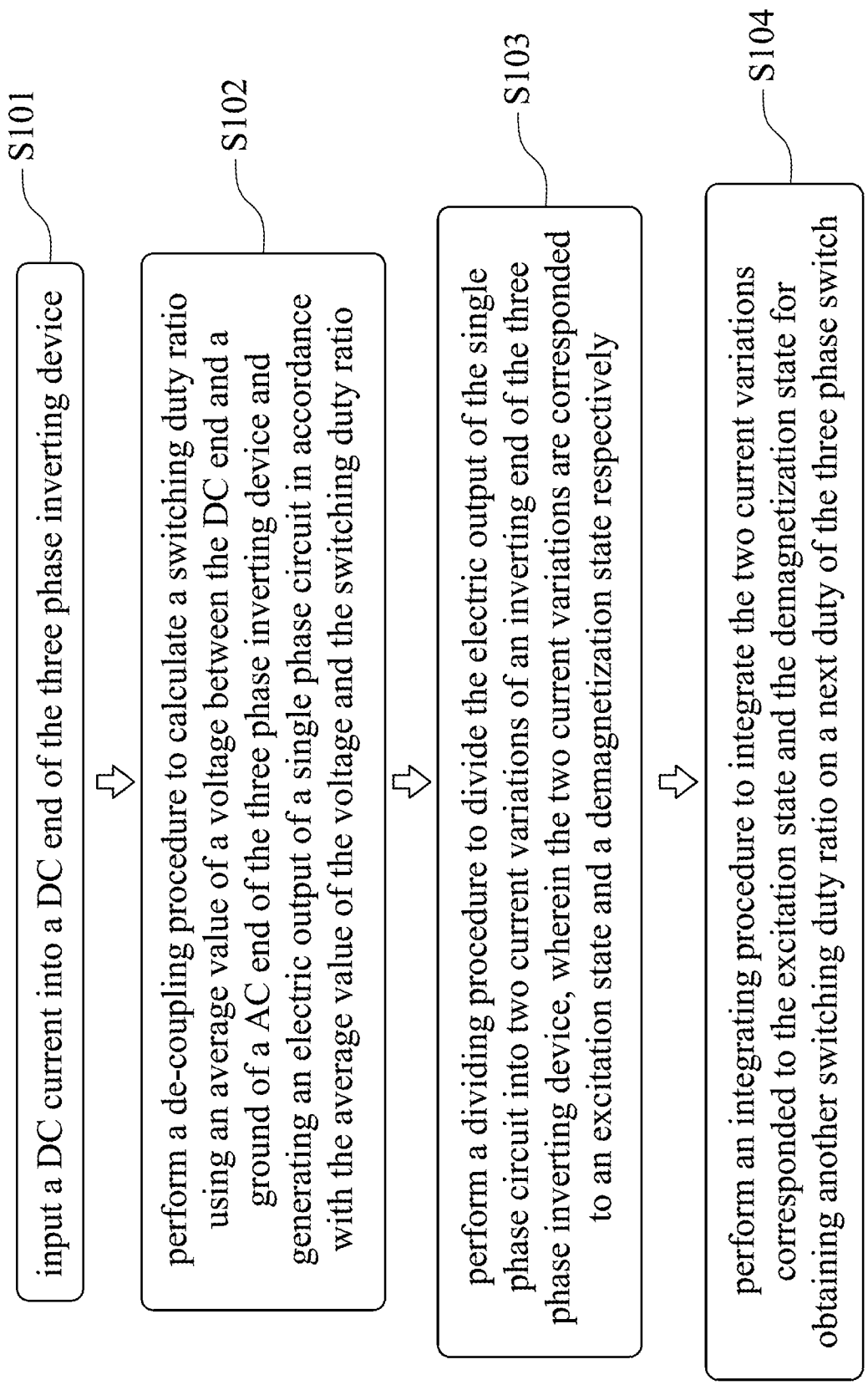
FIG. 1 is a flow chart showing a single phase controlling method according to one embodiment of the present disclosure.

FIG. 1 is a flow chart showing a single phase controlling method according to one embodiment of the present disclosure. The single phase controlling method of the present disclosure is applied in a three phase inverting device. The three phase inverting device includes a three phase switch. The single phase controlling method of the present disclosure includes: a step S101 for inputting a DC current into a DC end of the three phase inverting device; a step S102 for performing a de-coupling procedure to calculate a switching duty ratio using an average value of a voltage between the DC end and a ground of an AC end of the three phase inverting device and generating an electric output of a single phase circuit in accordance with the average value of the voltage and the switching duty ratio; a step S103 for performing a dividing procedure to divide the electric output of the single phase circuit into two current variations of an inverting end of the three phase inverting device, wherein the two current variations are corresponded to an excitation state and a demagnetization state respectively; a step S104 for performing an integrating procedure to integrate the two current variations corresponded to the excitation state and the demagnetization state for obtaining another switching duty ratio on a next duty of the three phase switch. In the aforementioned single phase controlling method, the de-coupling procedure, the dividing procedure and the integrating procedure can be performed through a controller. Furthermore, a converter parallel system can be obtained through connecting a plurality of the three phase inverting devices in parallel. The operation mechanism of the single phase controlling method of the present disclosure is then described.

For clearly understanding the present disclosure, the following table lists the definitions of the symbols of the circuit of the present disclosure.

| symbol | definition |
| --- | --- |
| $V_{nO}$ | a voltage between a virtual ground n and a ground of an inverter |
| $u_{RO}$ | a voltage of R phase relative to a ground 0 of an inverter between switches on the upper arm and the lower arm |
| $u_{SO}$ | a voltage of S phase relative to a ground 0 of an inverter between switches on the upper arm and the lower arm |
| $u_{TO}$ | a voltage of T phase relative to a ground 0 of an inverter between switches on the upper arm and the lower arm |
| $\Delta i_{iR}$ | a current variation of R phase at an inverter end of the inductance $L_i$ |
| $\Delta i_{iS}$ | a current variation of S phase at an inverter end of the inductance $L_i$ |
| $\Delta i_{iT}$ | a current variation of T phase at an inverter end of the inductance Li |
| $\Delta i_{CR}$ | a current variation of a capacitance of R phase of a LCL filter |
| $\Delta i_{CS}$ | a current variation of a capacitance of S phase of a LCL filter |
| $\Delta i_{CT}$ | a current variation of a capacitance of T phase of a LCL filter |
| $\Delta i_{CgR}$ | a current variation of a capacitance of R phase of a LCL filter |
| $\Delta i_{CgS}$ | a current variation of a capacitance of S phase of a LCL filter |
| $\Delta i_{CgT}$ | a current variation of a capacitance of T phase of a LCL filter |
| $L_{iR}$ | an inductance $L_i$ value of R phase at a switch end of a LCL filter |
| $L_{iS}$ | an inductance $L_i$ value of S phase at a switch end of a LCL filter |
| $L_{iT}$ | an inductance $L_i$ value of T phase at a switch end of a LCL filter |
| $L_{gR}$ | an inductance $L_g$ value of R phase at an AC end of a LCL filter |
| $L_{gS}$ | an inductance $L_g$ value of S phase at an AC end of a LCL filter |
| $L_{gT}$ | an inductance $L_g$ value of T phase at an AC end of a LCL filter |
| T | a time of a cycle |
| $V_{Rpn}$ | a voltage of R phase relative to a virtual ground n in an AC end |
| $V_{Spn}$ | a voltage of S phase relative to a virtual ground n in an AC end |
| $V_{Tpn}$ | a voltage of T phase relative to a virtual ground n in an AC end |
| $\Delta i_{Cg}$ | a current variation of a capacitance of a LCL filter |
| $i_{Cg}(t)$ | a current of a capacitance of a LCL filter at an instant cycle |
| $i_{Cg}(t - T_S)$ | a current of a capacitance of a LCL filter at previous cycle |
| $C_g$ | a capacitance of a LCL filter LCL |
| $V_{cgn}(t)$ | a voltage between two sides of the capacitance of LCL filter at an instant cycle |
| $V_{cgn}(t - T_S)$ | a voltage between two sides of the capacitance of LCL filter at previous cycle |
| $V_{cgn}(t - 2T_S)$ | a voltage between two sides of the capacitance of LCL filter at a cycle before the previous cycle |
| $T_{S0}$ | a time of $S_0$ sate during a cycle |
| $T_{S1}$ | a time of $S_1$ sate during a cycle |
| $T_{S2}$ | a time of $S_2$ sate during a cycle |
| $T_{S7}$ | a time of $S_7$ sate during a cycle |
| $S_0$ | a state showing that the switches of three phases are non-conductive |
| $S_1$ | a state showing that only the switch of R phase is conductive |
| $S_2$ | a state showing that only the switches of R and S phases are conductive |
| $S_7$ | a state showing that three phases are conductive |
| $D_R$ | a switching duty ratio of the switch of R phase R |
| $D_S$ | a switching duty ratio of the switch of S phase S |
| $D_T$ | a switching duty ratio of the switch of T phase T |
| $\overline{V_{nO}}$ | an average voltage between a virtual ground n and the ground O of the inverter |
| $V_{nOS0}$ | a voltage between the virtual ground n and the ground 0 of the inverter at $S_0$ state |
| $V_{nOS1}$ | a voltage between the virtual ground n and the ground 0 of the inverter at $S_1$ state |
| $V_{nOS2}$ | a voltage between the virtual ground n and the ground 0 of the inverter at $S_2$ state |
| $V_{nOS7}$ | a voltage between the virtual ground n and the ground 0 of the inverter at $S_7$ state |
| $V_{Rcn}(t)$ | a voltage of R phase between two sides of the capacitance of the LCL filter at an instant cycle |
| $V_{Rcn}(t - T_S)$ | a voltage of R phase between two sides of the capacitance of the LCL filter at an previous cycle |
| $V_{Rcn}(t - 2T_S)$ | a voltage of R phase between two sides of the capacitance of the LCL filter at a cycle before the previous cycle |
| $V_{Scn}(t)$ | a voltage of S phase between two sides of the capacitance of the LCL filter at an instant cycle |
| $V_{Scn}(t - T_S)$ | a voltage of S phase between two sides of the capacitance of the LCL filter at an previous cycle |
| $V_{Scn}(t - 2T_S)$ | a voltage of S phase between two sides of the capacitance of the LCL filter at a cycle before the previous cycle |
| $V_{Tcn}(t)$ | a voltage of T phase between two sides of the capacitance of the LCL filter at an instant cycle |
| $V_{Tcn}(t - T_S)$ | a voltage of T phase between two sides of the capacitance of the LCL filter at a previous cycle |
| $V_{Tcn}(t - 2T_S)$ | a voltage of T phase between two sides of the capacitance of the LCL filter at a cycle before the previous cycle |
| $D_{RST}$ | a switching duty ratio of the three phase switch |
| $L_{iRST}$ | a capacitance $L_i$ value at the AC end of the three phase LCL filter |
| $L_{gRST}$ | an inductance $L_g$ value at the AC end of the three phase LCL filter |
| $\Delta i_{iRST}$ | a current variation of the inductance $L_i$ at the inverter end of the three phase LCL filter |
| $V_{RSTpn}$ | a voltage relative to the virtual ground n at the AC end |
| $V_{RSTcN}(t)$ | a voltage of the capacitance relative to the ground N of the AC end of the three phase LCL filter at an instant cycle |
| $V_{RSTcN}(t - TS)$ | a voltage of the capacitance relative to the ground N of the AC end of the three phase LCL filter at a previous cycle |

-continued

| symbol | definition |
|---|---|
| $V_{RSTcN}(t - 2TS)$ | a voltage of the capacitance relative to the ground N of the AC end of the three phase LCL filter at a cycle before the previous cycle |
| $C_{gRST}$ | a capacitance value of the three phases of the LCL filter |
| $L_{gRST}$ | an inductance $L_g$ value at the AC end of the three phase LCL filter |
| X | an extra term of the duty ratio of the R phase switch R |
| Y | an extra term of the duty ratio of the S phase switch S |
| Z | an extra term of the duty ratio of the T phase switch T |
| $L_{ik}$ | an inductance $L_i$ value at the AC end of any phase of the three phase LCL filter |
| $\Delta i_{ik,mag}$ | a current variation of the inductance $L_i$ at the excitation sate at the inverter end of the LCL filter |
| dt | a time variation |
| $L_{gk}$ | an inductance $L_g$ value at the AC end of any phase of the three phase LCL filter |
| $\Delta i_{Ck,mag}$ | a current variation at the excitation state of any phase of the three phase LCL filter |
| $V_{kpn}$ | a voltage at the AC end relative to the virtual ground n of any phase of the three phases |
| $\Delta i_{ik,dem}$ | a current variation of the inductance $L_i$ at the demagnetization state at the inverter end |
| $\Delta i_{Ck,dem}$ | a current variation at the demagnetization state of any phase of the three phases of the capacitance of the LCL filter |
| $\Delta i_{ik}$ | a current variation of the inductance $L_i$ of any phase of the three phases at the inverter end of the LCL filter |
| $\Delta i_{Ck}$ | a current variation of the capacitance of any phase of the three phases at the inverter end of the LCL filter |
| $\Delta i_{ik}(n + 1)$ | a current variation of the inductance $L_i$ of any phase of the three phases the LCL filter at an instant cycle |
| $i_{gk,ref}(n + 1)$ | a reference current of the inductance $L_g$ of the LCL filter at a next cycle |
| $i_{gk,ref}(n)$ | a reference current of the inductance $L_g$ of the LCL filter at an instant cycle |
| $i_i(n)$ | a current of the inductance $L_i$ of single phase of the LCL filter at an instant cycle |
| $i_{ik}(n)$ | a current of the inductance $L_i$ of any phase of the three phases at an instant cycle |
| $i^*_{gk,ref}(n + 1)$ | a term used for substituting a portion of $\Delta i_{ik}(n + 1)$ |
| $L_{ge}(i)$ | an evaluation value of the inductance $L_g$ at the AC end of the LCL filter LCL |
| $L_{ie}(i)$ | an evaluation value of the inductance $L_i$ at the inverter end of the LCL filter LCL |
| $L_{Te}(i)$ | a summation of $L_{ge}(i)$ and $L_{ie}(i)$ |
| $d_{GC}(n + 1)$ | a duty ration at a next cycle |
| $v_{kpn}(n)$ | a voltage relative to the virtual ground n of any phase of the three phases |
| $v_{dc}(n)$ | a DC voltage of the inverter end at an instant cycle |
| $i_{ck}(n)$ | a current of the capacitance of any phase of the three phases of the LCL filter at an instant cycle |
| $i_{ck}(n - 1)$ | a current of the capacitance of any phase of the three phases of the LCL filter at an previous cycle |
| $v_{kcn}(n)$ | a voltage relative to the virtual ground n of the capacitance of any phase of the three phases of the LCL filter at an instant cycle |
| $v_{kcn}(n - 1)$ | a voltage relative to the virtual ground n of the capacitance of any phase of the three phases of the LCL filter at an previous cycle |
| $v_{kcn}(n - 2)$ | a voltage relative to the virtual ground n of the capacitance of any phase of the three phases of the LCL filter at a cycle before the previous cycle |
| $V_{RN}$ | a voltage of R phase which relative to a ground N of a supply mains at the AC end |
| $V_{SN}$ | a voltage of S phase which relative to a ground N of a supply mains at the AC end |
| $V_{TN}$ | a voltage of T phase which relative to a ground N of a supply mains at the AC end |
| $L_l$ | an equivalent inductance at the AC end |
| SCR | a short circuit ratio of the power grid of the supply mains |
| $I_{IR}$ | a current of the equivalent inductance of R phase at the AC end |
| $I_{IS}$ | a current of the equivalent inductance of S phase at the AC end |
| $I_{IT}$ | a current of the equivalent inductance of T phase at the AC end |
| $I_{gR1}$ | a current of the inductance $L_g$ of R phase of the LCL filter of the first inverter in the inverter parallel system |
| $I_{gS1}$ | a current of the inductance $L_g$ of S phase of the LCL filter of the first inverter in the inverter parallel system |
| $I_{gT1}$ | a current of the inductance $L_g$ of T phase of the LCL filter of the first inverter in the inverter parallel system |
| $I_{gR2}$ | a current of the inductance $L_g$ of R phase of the LCL filter of the second inverter in the inverter parallel system |
| $I_{gS2}$ | a current of the inductance $L_g$ of S phase of the LCL filter of the second inverter in the inverter parallel system |
| $I_{gT2}$ | a current of the inductance $L_g$ of T phase of the LCL filter of the second inverter in the inverter parallel system |
| $I_{gR3}$ | a current of the inductance $L_g$ of R phase of the LCL filter of the third inverter in the inverter parallel system |
| $I_{gS3}$ | a current of the inductance of S phase of the LCL filter of the third inverter in the inverter parallel system |
| $I_{gT3}$ | a current of the inductance $L_g$ of T phase of the LCL filter of the third inverter in the inverter parallel system |

Figure 2:
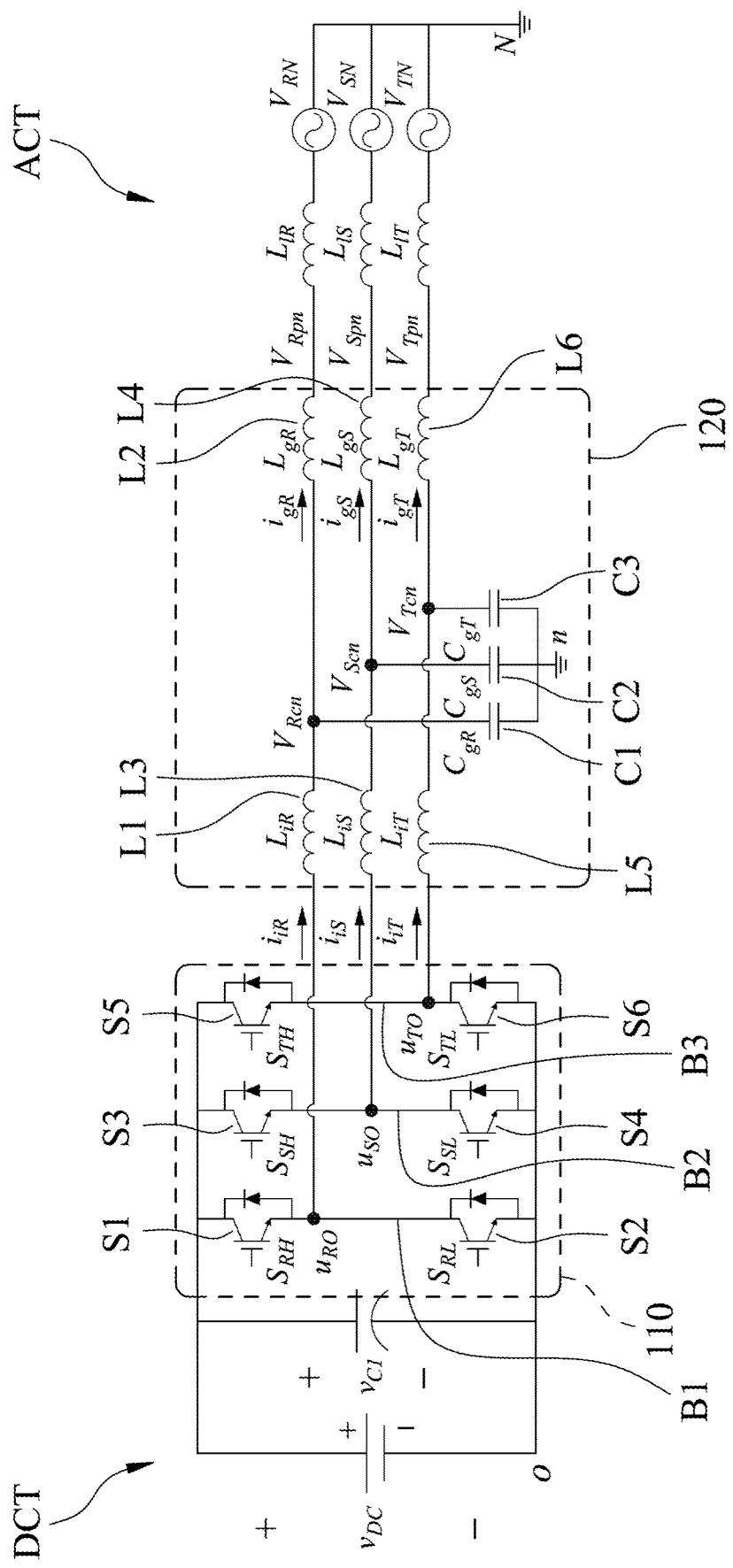
FIG. 2 is a schematic view showing a circuit of a three phase inverting device using the single phase controlling method of FIG. 1.

FIG. 2 is a schematic view showing a circuit of a three phase inverting device using the single phase controlling method of FIG. 1. In FIG. 2, the three phase inverting device includes a three phase inverter module 110 and a three phase filter module 120. In the embodiment, the switches S1-S6 of the three phase inverter module 110 are arranged to form a full-bridge inverter circuit, however, it is also possible to use a half-bridge inverter circuit or other type of the inverter circuit, there is no limitations. The three phase filter module 120 includes inductances L1-L6 and capacitances C1-C3, thereby forming a three phase LCL filter. The three phase inverter module 110 includes a DC end DCT, and three phases are represented by symbols R, S ant T respectively. The switch S1 and the switch S2 are connected to form a bridge arm B1; the switch S3 and the switch S4 are connected to form a bridge arm B2; and the switch S5 and the switch S6 are connected to form a bridge arm B3. An input end of each of the bridge arms B1-B3 are connected as the DC end DCT, which connects to a front end of a DC load (e.g. solar cell) for receiving or outputting a DC voltage VDC. An output end of each of the bridge arms B1-B3 is connected to one end of each of the inductances L1, L3 and L5. The other end of each of the inductances L1, L3 and L5 is connected to each of the capacitances C1-C3. One end of each of the inductances L2, L4 and L6 is connected to each of the capacitances C1-C3. The other end of each of the inductances L2, L4 and L6 is connected to a three phase power of an AC end ACT (e.g. supply mains or other AC power source).

Each of the switches S1-S6 can be controlled independently by a controlling signal so that a conductive state of each of the switches S1-S6 can be controlled. The switches S1, S3 and S5 are located in an upper arm of the bridge arms B1-B3. The switches S2, S4 and S6 are located in a lower arm of the bridge arms B1-B3. The switches in the same arm will be conducted with each other alternatively in accordance with the signal received (e.g. the switches S1 and S2 are conducted with each other alternatively; the switches S3 and S4 are conducted with each other alternatively; and the switches S5 and S6 are conducted with each other alternatively). Therefore, voltages $u_{RO}$、$u_{SO}$ and $u_{TO}$ are generated on the output end of the bridge arms B1-B3 in accordance with the DC voltage $V_{DC}$. The inductances L1-L6 can store or release energy in accordance with voltage variations of the voltages $u_{RO}$、$u_{SO}$ and $u_{TO}$. The capacitances C1-C3 have filtering effect. Therefore, an electric power can be transformed between the DC end DCT and the AC end ACT of the three phase inverting device.

The operation mechanism of the single phase controlling method of the present disclosure is then described in the following paragraphs.

Assuming that $V_{nO}$ represents a voltage of the three phases which are all connected to a ground n and a ground O, the $V_{nO}$ can be represented by the following equations (1), (2) and (3) in accordance with a Kirchhoff's law:

$$V_{nO} = u_{RO} - \frac{\Delta i_{iR} L_{iR}}{T} - \frac{(\Delta i_{iR} - \Delta i_{CR})L_{gR}}{T} - V_{Rpn}, \quad (1)$$

$$V_{nO} = u_{SO} - \frac{\Delta i_{iS} L_{iS}}{T} - \frac{(\Delta i_{iS} - \Delta i_{CS})L_{gS}}{T} - V_{Spn}, \quad (2)$$

$$V_{nO} = u_{TO} - \frac{\Delta i_{iT} L_{iT}}{T} - \frac{(\Delta i_{iT} - \Delta i_{CT})L_{gT}}{T} - V_{Tpn}. \quad (3)$$

The equations (1), (2) and (3) can be combined to equation (4), and $\Delta i_{Cg}$ can be replaced by a voltage of a capacitance, which is shown in equation (5):

$$V_{nO} = \frac{u_{RO} + u_{SO} + u_{TO}}{3} - \frac{\frac{\Delta i_{iR} L_{iR}}{T_S} + \frac{\Delta i_{iS} L_{iS}}{T_S} + \frac{\Delta i_{iT} L_{iT}}{T_S}}{3} - \frac{V_{Rpn} + V_{Spn} + V_{Tpn}}{3} - \frac{\frac{(\Delta i_{iR} - \Delta i_{CgR})L_{gR}}{T_S} + \frac{(\Delta i_{iS} - \Delta i_{CgS})L_{gS}}{T_S} + \frac{(\Delta i_{iT} - \Delta i_{CgT})L_{gT}}{T_S}}{3}, \quad (4)$$

$$\Delta i_{Cg} = i_{Cg}(t) - i_{Cg}(t - T_S) \quad (5)$$
$$= C_g \left( \frac{V_{cgn}(t) - V_{cgn}(t - T_S)}{T_S} - \frac{V_{cgn}(t - T_S) - V_{cgn}(t - 2T_S)}{T_S} \right)$$
$$= C_g \frac{V_{cgn}(t) - 2V_{cgn}(t - T_S) + V_{cgn}(t - T_S)}{T_S}.$$

Figure 3:
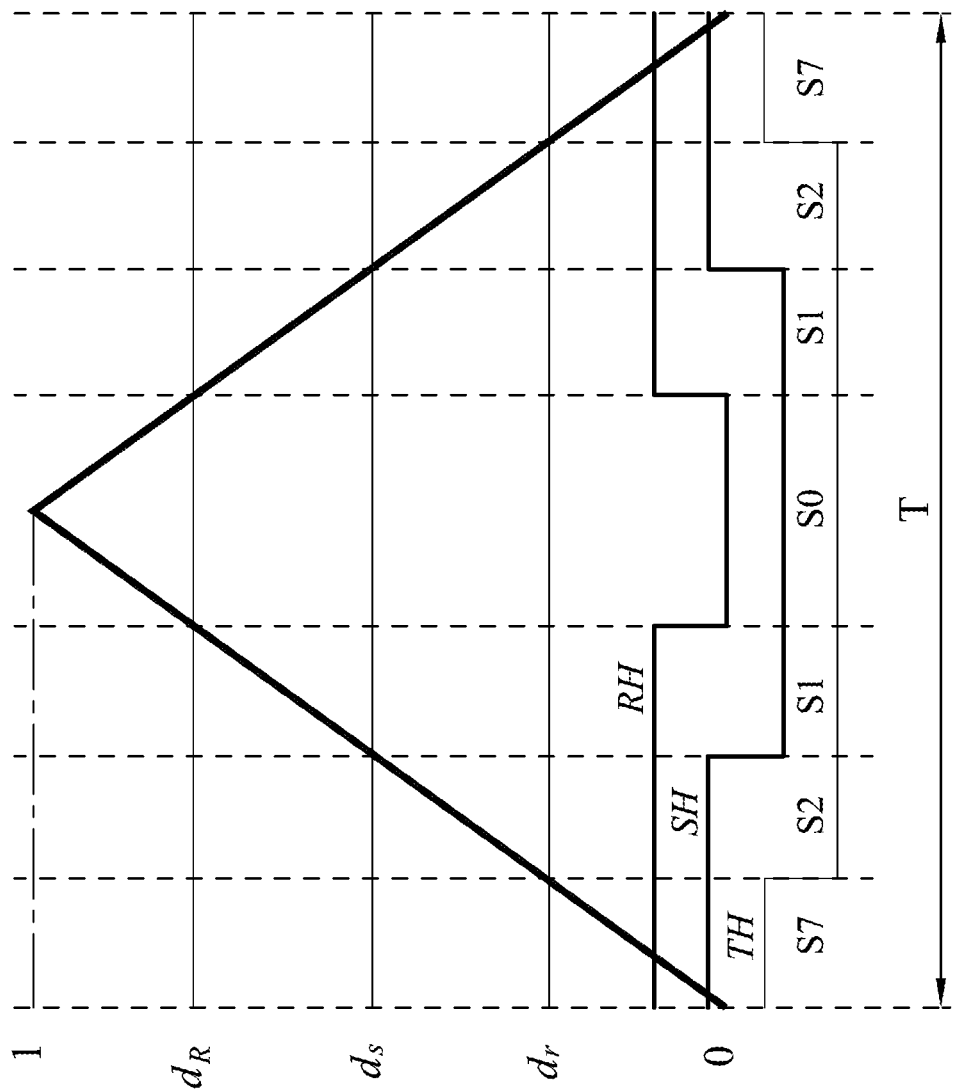
FIG. 3 is a schematic view showing a switching state of a three phase switch of FIG. 2.
Figure 4:
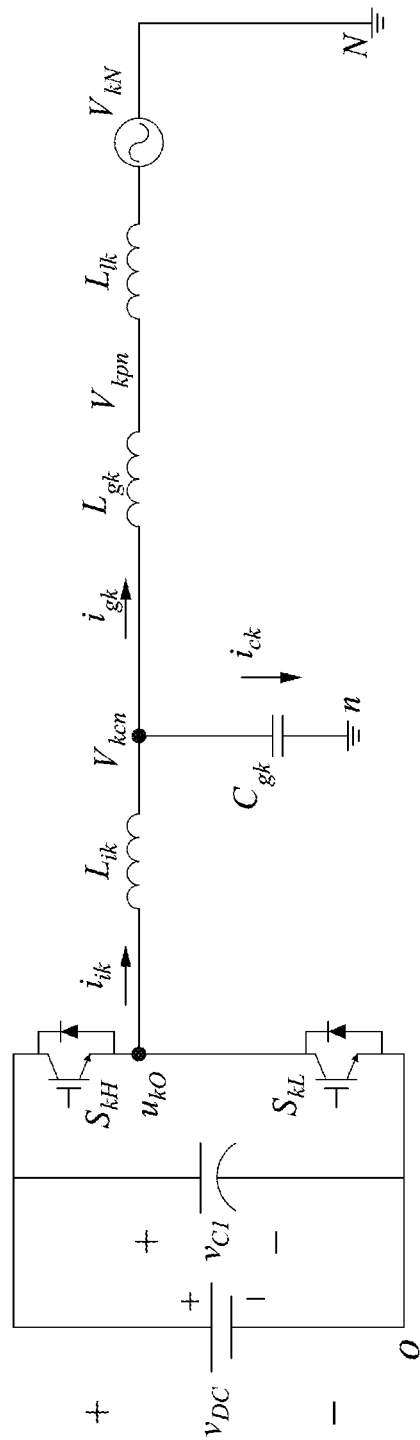
FIG. 4 is schematic view showing a single phase circuit of the three phase inverting device of FIG. 2.

As shown in FIG. 3, when the three phase switches switching signals, a cycle can be divided into six regions, seven states S0, S1, S2, S3, S4, S5, S6 and S7 can be presented in each of the regions, and four states S0, S1, S2 and S7 can be presented in some regions. Therefore, the occupied time T can be shown with a duty ratio of the three phase switches and voltages $u_{RO}$, $u_{SO}$ and $u_{TO}$, in the following TABLE 1.

TABLE 1

| | $U_{RO}$ | $U_{SO}$ | $U_{TO}$ | T |
|---|---|---|---|---|
| S0 | 0 | 0 | 0 | $T_{S0} = (1 - D_R)T$ |
| S1 | $V_{DC}$ | 0 | 0 | $T_{S1} = (D_R - D_S)T$ |
| S2 | $V_{DC}$ | $V_{DC}$ | 0 | $T_{S2} = (D_S - D_T)T$ |
| S7 | $V_{DC}$ | $V_{DC}$ | $V_{DC}$ | $T_{S7} = (D_T - 0)T$ |

Accordingly, $\overline{V_{nO}}$ can be represented by the following equation (6):

$$\overline{V_{nO}} = \frac{T_{S0} V_{nOS0} + T_{S1} V_{nOS1} + T_{S2} V_{nOS2} + T_{S7} V_{nOS7}}{T_S} \quad (6)$$
$$= (1 - D_R) V_{nOS0} + (D_R - D_S) V_{nOS1} +$$
$$(D_S - D_T) V_{nOS2} + D_T V_{nOS7}.$$

$V_{nOS0}$, $V_{nOS1}$, $V_{nOS2}$ and $V_{nOS7}$ can be represented by the following equations (7), (8), (9) and (10):

$$V_{nOS0} = -\frac{\Delta i_{iR} L_{iR} + \Delta i_{iS} L_{iS} + \Delta i_{iT} L_{iT}}{3T_S} - \frac{V_{Rpn} + V_{Spn} + V_{Tpn}}{3} - \frac{(\Delta i_{iR} - \Delta i_{CgR})L_{gR} + (\Delta i_{iS} - \Delta i_{CgS})L_{gS} + (\Delta i_{iT} - \Delta i_{CgT})L_{gT}}{3T_S}, \quad (7)$$

$$V_{nOS1} = \frac{V_{DC}}{3} - \frac{\Delta i_{iR} L_{iR} + \Delta i_{iS} L_{iS} + \Delta i_{iT} L_{iT}}{3T_S} - \frac{V_{Rpn} + V_{Spn} + V_{Tpn}}{3} - \frac{(\Delta i_{iR} - \Delta i_{CgR})L_{gR} + (\Delta i_{iS} - \Delta i_{CgS})L_{gS} + (\Delta i_{iT} - \Delta i_{CgT})L_{gT}}{3T_S}, \quad (8)$$

$$V_{nOS2} = \frac{2V_{DC}}{3} - \frac{\Delta i_{iR} L_{iR} + \Delta i_{iS} L_{iS} + \Delta i_{iT} L_{iT}}{3T_S} - \frac{V_{Rpn} + V_{Spn} + V_{Tpn}}{3} - \frac{(\Delta i_{iR} - \Delta i_{CgR})L_{gR} + (\Delta i_{iS} - \Delta i_{CgS})L_{gS} + (\Delta i_{iT} - \Delta i_{CgT})L_{gT}}{3T_S}, \quad (9)$$

$$V_{nOS7} = V_{DC} - \frac{\Delta i_{iR} L_{iR} + \Delta i_{iS} L_{iS} + \Delta i_{iT} L_{iT}}{3T_S} - \frac{V_{Rpn} + V_{Spn} + V_{Tpn}}{3} - \frac{(\Delta i_{iR} - \Delta i_{CgR})L_{gR} + (\Delta i_{iS} - \Delta i_{CgS})L_{gS} + (\Delta i_{iT} - \Delta i_{CgT})L_{gT}}{3T_S}. \quad (10)$$

Therefore, $\overline{V_{nO}}$ can be represented by the following equation (11)

$$\overline{V_{nO}} = \frac{V_{DC}}{3}(D_R + D_S + D_T) - \frac{V_{Rpn} + V_{Spn} + V_{Tpn}}{3} - \frac{\Delta i_{iR}(L_{iR} + L_{gR}) + \Delta i_{iS}(L_{iS} + L_{gS}) + \Delta i_{iT}(L_{iT} + L_{gT})}{3T_S} - \frac{[V_{Rcn}(t) - 2V_{Rcn}(t - T_S) + V_{Rcn}(t - 2T_S)]C_{gR}L_{gR}}{3T_S^2} - \frac{[V_{Scn}(t) - 2V_{Scn}(t - T_S) + V_{Scn}(t - 2T_S)]C_{gS}L_{gS}}{3T_S^2} - \frac{[V_{Tcn}(t) - 2V_{Tcn}(t - T_S) + V_{Tcn}(t - 2T_S)]C_{gT}L_{gT}}{3T_S^2}. \quad (11)$$

Thus, a switching duty ratio of the three phase switch can be represented by the following equation (12):

$$D_{RST} = \frac{(L_{iRST} + L_{gRST})\Delta i_{iRST}}{V_{DC}T_S} + \frac{V_{RSTpn}}{V_{DC}} + \frac{[V_{RSTcN}(t) - 2V_{RSTcN}(t-T_S) + V_{RSTcN}(t-2T_S)]C_{gRST}L_{gRST}}{V_{DC}T_S^2} + \frac{\overline{V_{nO}}}{V_{DC}}. \quad (12)$$

An aspect of the present disclosure is to use a single phase to control three phases. Therefore, it is needed to prove that the duty ratio of each of the three phases R, S and T is the same, thereby completing the de-coupling procedure. From the above equation (12), it is known that $$\frac{(L_{iRST} + L_{gRST})\Delta i_{iRST}}{V_{DC}T_S}, \frac{V_{RSTpn}}{V_{DC}} \text{ and }$$

$$\frac{[V_{RSTcN}(t) - 2V_{RSTcN}(t-T_S) + V_{RSTcN}(t-2T_S)]C_{gRST}L_{gRST}}{V_{DC}T_S^2}$$

can be independently presented in each of the three phases R, S and T respectively; however, in the $\overline{V_{nO}}$ shown in the equation (11), the three phases R, S and T are coupled with each other and cannot be divided into a single phase equation. Therefore, it is assumed that in the duty ratio of each of the three phases R, S and T, in addition to the three terms mentioned above, there is an unknown part. Therefore, when dividing the duty ratio of the three phases into the duty ratio of the single phase, assuming that the unknown part of the duty ratio of the R phase can be combined into an extra term X (the number of the equations in X is not limited); the unknown part of the duty ratio of the S phase can be combined into an extra term Y (the number of the equations in Y is not limited); the unknown part of the duty ratio of the T phase can be combined into an extra term Z (the number of the equations in Y is not limited). The duty ratio of each of the three phases can be represented by the following equations (13), (14) and (15):

$$D_R = \frac{(L_{iR} + L_{gR})\Delta i_{iR}}{V_{DC}T_S} + \frac{V_{Rpn}}{V_{DC}} + \frac{[V_{RcN}(t) - 2V_{RcN}(t-T_S) + V_{RcN}(t-2T_S)]C_{gR}L_{gR}}{V_{DC}T_S^2} + X, \quad (13)$$

$$D_S = \frac{(L_{iS} + L_{gS})\Delta i_{iS}}{V_{DC}T_S} + \frac{V_{Spn}}{V_{DC}} + \frac{[V_{ScN}(t) - 2V_{ScN}(t-T_S) + V_{ScN}(t-2T_S)]C_{gS}L_{gS}}{V_{DC}T_S^2} + Y, \quad (14)$$

$$D_T = \frac{(L_{iT} + L_{gT})\Delta i_{iT}}{V_{DC}T_S} + \frac{V_{Tpn}}{V_{DC}} + \frac{[V_{TcN}(t) - 2V_{TcN}(t-T_S) + V_{TcN}(t-2T_S)]C_{gT}L_{gT}}{V_{DC}T_S^2} + Z. \quad (15)$$

Substituting the equations (13), (14) and (15) to the equation (11), an equation (16) can be derived as follows:

$$\overline{V_{nO}} = \frac{V_{DC}}{3}(X + Y + Z). \quad (16)$$

Assuming that the terms X, Y and Z are equal, $\overline{V_{nO}}$ can be represented by the equation (17):

$$\overline{V_{nO}} = V_{DC}X = V_{DC}Y = V_{DC}Z \quad (17).$$

Therefore, the duty ratio of the three phase switch returns back to the equation (12), showing that the three phases can be de-coupled to three single phases. Therefore, an operation of the three phases can be controlled by controlling three independent single phases being de-coupled.

The dividing procedure as shown in FIG. 3, in an excitation state, an equation (18) can be derived in accordance with a Kirchhoff's law, and an equation (19) can be used to represent an excitation current variation $\Delta i_{ik,mag}$ of the inverter end, where k represents any one of the three phases R, S and T, the equations (18) and (19) are as follows:

$$V_{dc} = L_{ik}\frac{\Delta i_{ik,mag}}{dt} + L_{gk}\frac{\Delta i_{ik,mag} - \Delta i_{Ck,mag}}{dt} + V_{kpn}, \quad (18)$$

$$\Delta i_{ik,mag} = \frac{(V_{dc} - V_{kpn})dt}{L_{ik} + L_{gk}} + \Delta i_{Ck,mag}\frac{L_{gk}}{L_{ik} + L_{gk}}. \quad (19)$$

where dt=dTs.

In a demagnetization state, an equation (20) can also be derived in accordance with a Kirchhoff's law, and an equation (21) can be used to represent a demagnetization current variation $\Delta i_{ik,dem}$ of the inverter end, the equations (20) and (21) are as follows:

$$V_{dc} = L_{ik}\frac{-\Delta i_{ik,dem}}{dt} + L_{gk}\frac{-\Delta i_{ik,dem} + \Delta i_{Ck,dem}}{dt} + V_{kpn}, \quad (20)$$

$$\Delta i_{ik,dem} = \frac{-(V_{dc} - V_{kpn})dt}{L_{ik} + L_{gk}} + \Delta i_{Ck,dem}\frac{L_{gk}}{L_{ik} + L_{gk}}. \quad (21)$$

where dt=(1−d)Ts.

In the integrating procedure, when combining the excitation current $\Delta i_{ik,mag}$ in the equation (19) and the demagnetization current $\Delta i_{ik,dem}$ in the equation (21), an equation (22) can be obtained as follows:

$$\Delta i_{ik} = \quad (22)$$
$$\Delta i_{ik,mag} + \Delta i_{ik,dem} = \frac{2V_{dc}T_S}{L_{ik} + L_{gk}}d - \frac{(V_{dc} + V_{kpn})T_S}{L_{ik} + L_{gk}} + \frac{L_{gk}}{L_{ik} + L_{gk}}\Delta i_{Ck}.$$

The current in the converter end in the next cycle can be represented as an equation (23), which can be viewed as a summation of a difference between a reference current in the instant cycle and the reference current in the next cycle and a difference between the reference current in the instant cycle and the current in the converter end, the equation (23) is as follows:

$$\Delta i_{ik}(n+1) = \{i_{gk,ref}(n+1) - i_{gk,ref}(n)\} + \{i_{gk,ref}(n) - i_i(n)\} = i_{gk,ref}(n+1) - i_{ik}(n) \quad (23)$$

The switching duty ratio in the next cycle can be obtained using the equations (22) and (23), which is represented as an equation (24), in which $i^*_{gk,ref}(n+1)$ can be represented by an equation (25), and the equation (25) can be rewritten to an equation (26):

$$d_{GC}(n+1) = \frac{1}{2} + \frac{v_{kpn}(n)}{2v_{dc}(n)} + L_{Te}(i)\frac{i^*_{gk,ref}(n+1) - i_{ik}(n)}{2v_{dc}(n)T_S}, \quad (24)$$

-continued $$i^*_{gk,ref}(n+1) = i_{gk,ref}(n+1) + \frac{L_{ge}(i)}{L_{Te}(i)}(i_{ck}(n) - i_{ck}(n-1)), \quad (25)$$

$$i^*_{gk,ref}(n+1) = \quad (26)$$
$$i_{gk,ref}(n+1) + \frac{L_{ge}(i)}{L_{Te}(i)} \frac{C_g(v_{kcn}(n) - 2v_{kcn}(n-1) + v_{kcn}(n-2))}{T_S}.$$

Figure 5:
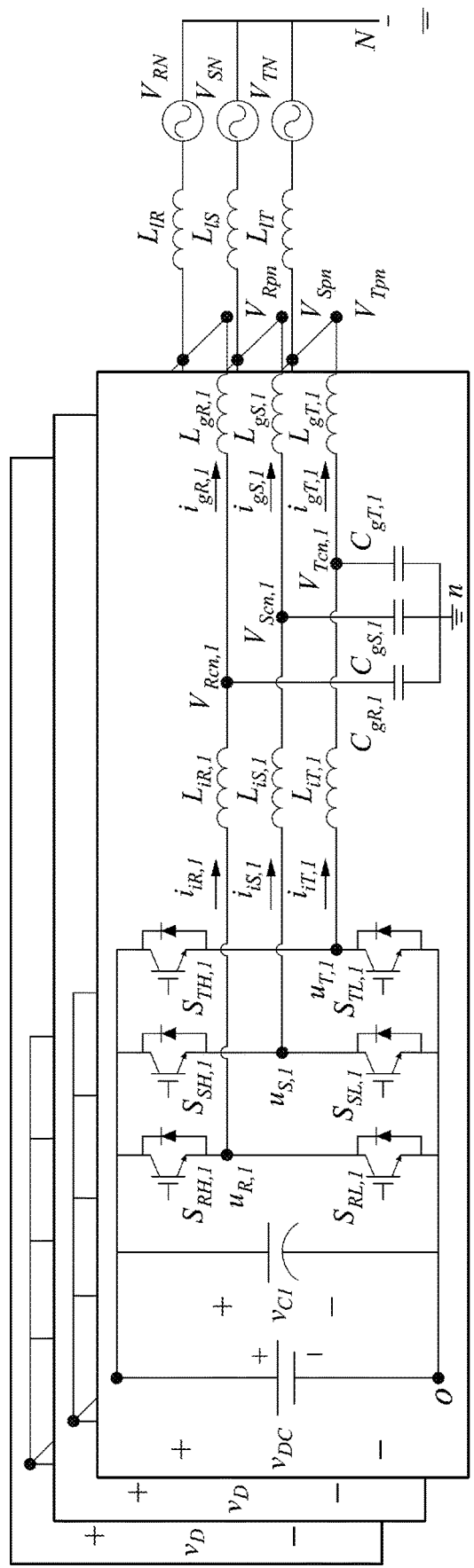
FIG. 5 is schematic view showing that the three phase inverting devices of FIG. 2 are connected in parallel for forming an inverter parallel system.

FIG. 5 is schematic view showing that the three phase inverting devices of FIG. 2 are connected in parallel for forming an inverter parallel system. In the embodiment, the DC end of each of the three phase inverting device are connected in parallel for receiving and outputting the current voltage $V_{DC}$, and an output end of the three phase filter module 120 are connected in parallel, therefore a three phase power can be provided to an AC circuit in the back end, or the three phase power can be received through the AC circuit for inverting. In this kind of client-server architecture, one of the three phase inverting devices is functioned as a server and takes charge of a modulation of an output voltage, the other of the three phase inverting devices is functioned as a client and takes charge of tracing current commands send by the main three phase inverting device. Therefore, a current-sharing control can be achieved, and each of the three phase inverting devices has an equivalent power output. Furthermore, in a conventional inverter parallel system, the value of the output current of each of the inverters is inconsistent, thus unbalanced currents are generated in the system, so called circulating currents. In the inverter parallel system of the present disclosure, the single phase controlling method is applied to each of the three phase inverting devices. The circuit of each phase of the three phase inverting device is treated as an independent single circuit, and the current command of each of the three phase inverting devices is traced independently. Therefore, the circulating current between each of the three phase inverting devices can be dramatically reduced. The effects of the single phase controlling method of the present disclosure applied to the aforementioned inverter parallel system are then described in the following paragraphs.

In an example, the three phase inverting device of the present disclosure is applied in an AC end (e.g., a supply mains). The parameter settings in a simulation circuit are shown in TABLE 2.

TABLE 2

| | |
|---|---|
| DC current inputted from the inverter end | 400 V |
| AC voltage of the AC end | 220 V |
| switching frequency of the switch | 20 kHz |
| power | 30 kVA |
| inductance $L_{ik}$ of the filter | 1.5 mH |
| capacitance $C_{gk}$ of the filter | 10 μH |
| inductance $L_{gk}$ of the filter | 0.5 mH |
| effective inductance $L_{lk}$ of the transmission line | 0~146.2 μH |

For evaluating the efficiency of the single phase controlling method of the present disclosure, five times of harmonic wave and seven times of harmonic wave are inputted to the system, as shown in TABLE 3. The AC voltage of the AC end is set to an unbalance state, as shown in TABLE 4.

TABLE 3

| harmonic wave | |
|---|---|
| five times | 5% of 220 Vrms |
| seven times | 5% of 220 Vrms |

TABLE 4

| | unbalance state of the supply mains |
|---|---|
| $V_{RN}$ | $\frac{220}{\sqrt{2}}\sin(2\pi 60t)$ |
| $V_{SN}$ | $\frac{242}{\sqrt{2}}\sin(2\pi 60t - 120°)$ |
| $V_{TN}$ | $\frac{176}{\sqrt{2}}\sin(2\pi 60t + 120°)$ |

Figure 6:
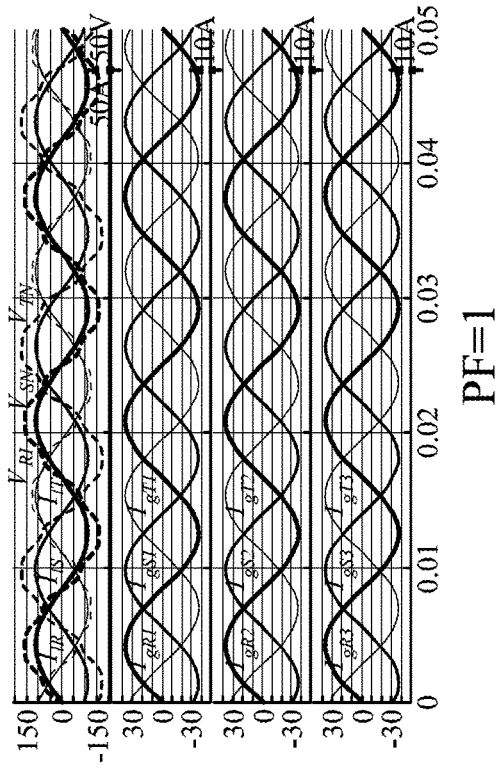
FIG. 6 is a schematic view showing a comparison of three phase currents in an AC end and an inverter end when a supply mains is in four different power factors and in a strong power grid.
Figure 6:
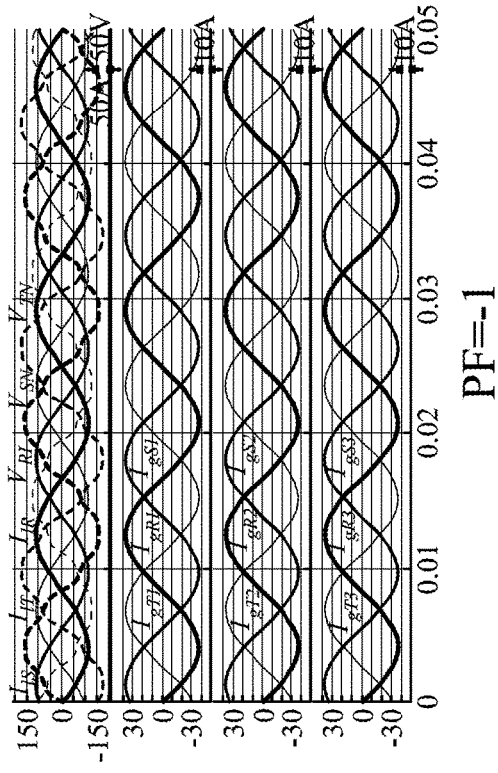
Figure 6:
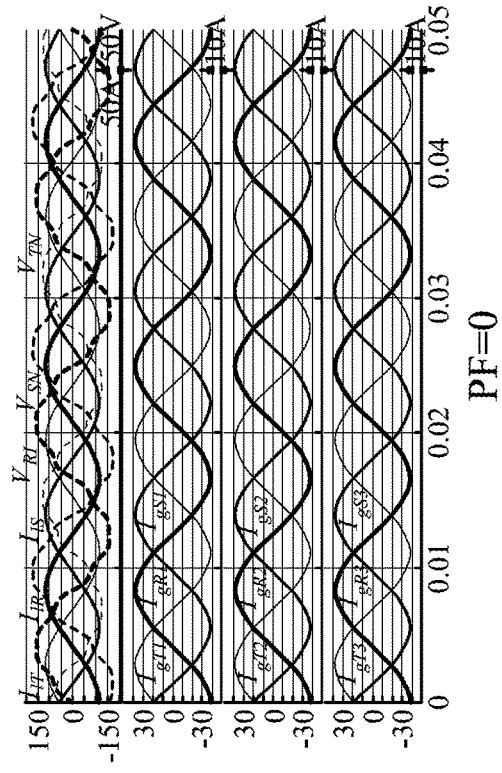
Figure 6:
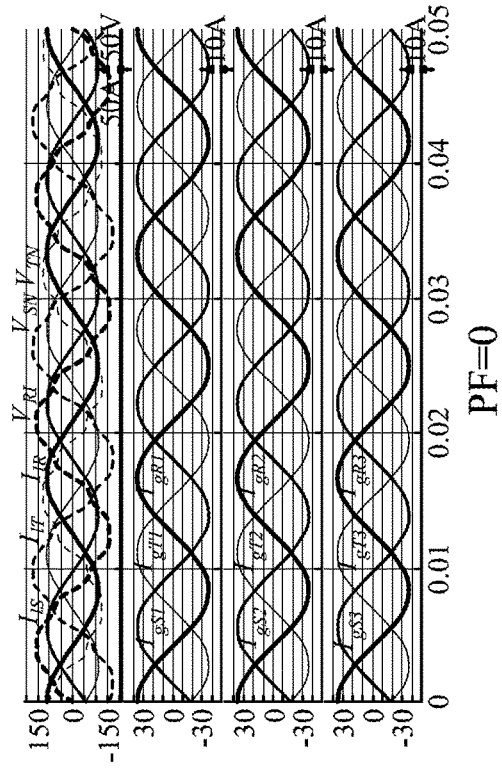

FIG. 6 is a schematic view showing a comparison of three phase currents in an AC end and an inverter end when a supply mains is in four different power factors and in a strong power grid. The strong power grid indicates that (L1=0, SCR=∞). The current and the THD (Total Harmonic Distortion) of FIG. 6 are shown in TABLE 5. In TABLE 5, it is shown that the single phase controlling method of the present disclosure is performed under the strong power grid. When the power factor is 1 or −1, the THD is smaller than 0.93%. When the power factor is 0, and the current lags the voltage, the THD is smaller than 0.92%. When the power factor is 0, and the current leads the voltage, the THD is smaller than 0.95%.

TABLE 5

| | | PF = 1 | | PF = −1 | | PF = 0 (lgs) | | PF = 0 (leds) | |
|---|---|---|---|---|---|---|---|---|---|
| | | THD | current | THD | current | THD | current | THD | current |
| AC end | $I_{IR}$ | 0.92% | 111.6 A | 0.92% | 111.3 A | 0.90% | 113.4 A | 0.93% | 109.5 A |
| | $I_{IS}$ | 0.92% | 111.3 A | 0.92% | 111.6 A | 0.90% | 113.5 A | 0.94% | 109.4 A |
| | $I_{IT}$ | 0.92% | 111.4 A | 0.92% | 111.5 A | 0.90% | 113.2 A | 0.93% | 109.7 A |
| Inverter 1 | $I_{gR1}$ | 0.92% | 37.2 A | 0.92% | 37.1 A | 0.91% | 37.8 A | 0.94% | 36.49 A |
| | $I_{gS1}$ | 0.92% | 37.11 A | 0.92% | 37.2 A | 0.90% | 37.83 A | 0.94% | 36.46 A |
| | $I_{gT1}$ | 0.93% | 37.13 A | 0.92% | 37.17 A | 0.91% | 37.73 A | 0.94% | 36.56 A |
| Inverter 2 | $I_{gR2}$ | 0.92% | 37.2 A | 0.92% | 37.1 A | 0.91% | 37.8 A | 0.94% | 36.49 A |
| | $I_{gS2}$ | 0.92% | 37.11 A | 0.92% | 37.2 A | 0.91% | 37.83 A | 0.94% | 36.46 A |
| | $I_{gT2}$ | 0.92% | 37.13 A | 0.92% | 37.17 A | 0.90% | 37.73 A | 0.94% | 36.56 A |
| Inverter 3 | $I_{gR3}$ | 0.92% | 37.2 A | 0.92% | 37.1 A | 0.91% | 37.8 A | 0.94% | 36.49 A |
| | $I_{gS3}$ | 0.92% | 37.11 A | 0.92% | 37.2 A | 0.91% | 37.83 A | 0.94% | 36.46 A |
| | $I_{gT3}$ | 0.92% | 37.13 A | 0.92% | 37.17 A | 0.91% | 37.73 A | 0.94% | 36.56 A |

Figure 7:
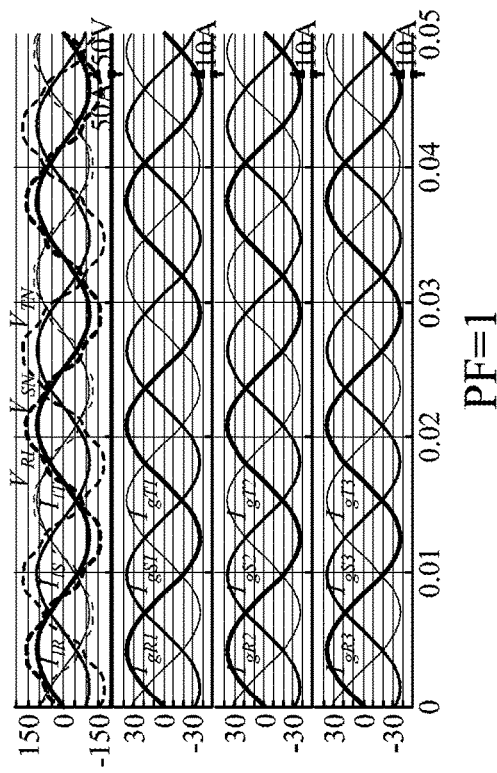
FIG. 7 is a schematic view showing a comparison of three phase currents in an AC end and an inverter end when a supply mains is in four different power factors and in a weak power grid.
Figure 7:
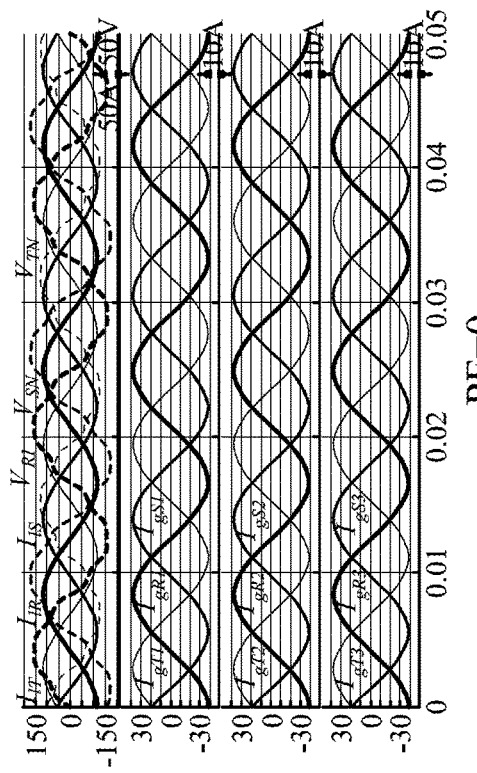
Figure 7:
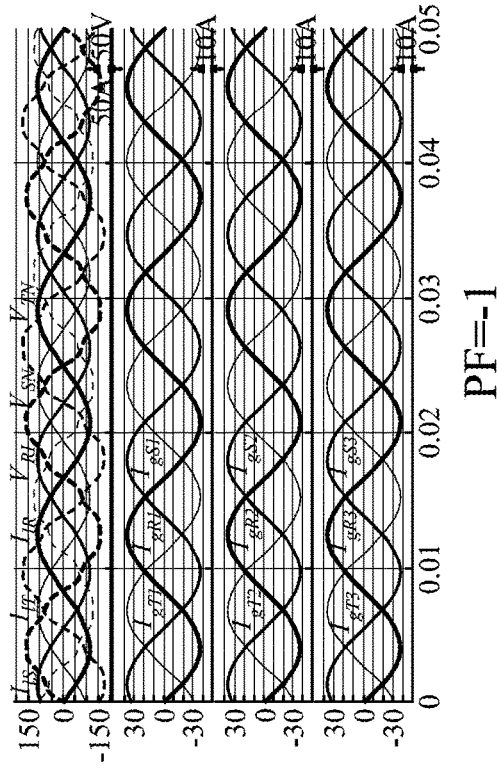
Figure 7:
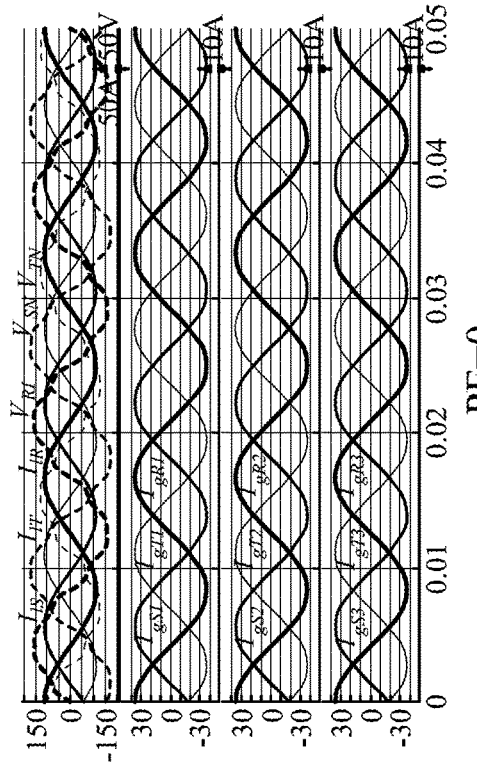

FIG. 7 is a schematic view showing a comparison of three phase currents in an AC end and an inverter end when a supply mains is in four different power factors and in a weak power grid. The strong power grid indicates that (L1=146.2 µH, SCR=10). The current and the THD (Total Harmonic Distortion) of FIG. 7 are shown in TABLE 6. In TABLE 6, it is shown that the single phase controlling method of the present disclosure is performed under the strong power grid. When the power factor is 1 or −1, the THD is smaller than 0.96%. When the power factor is 0, and the current lags the voltage, the THD is smaller than 0.94%. When the power factor is 0, and the current leads the voltage, the THD is smaller than 0.98%.

TABLE 6

| | | PF = 1 | | PF = −1 | | PF = 0 (lgs) | | PF = 0 (leds) | |
|---|---|---|---|---|---|---|---|---|---|
| | | THD | current | THD | current | THD | current | THD | current |
| AC end | $I_{iR}$ | 0.94% | 111.7 A | 0.94% | 111.4 A | 0.93% | 113.5 A | 0.96% | 109.5 A |
| | $I_{iS}$ | 0.94% | 111.4 A | 0.94% | 111.7 A | 0.92% | 113.6 A | 0.96% | 109.4 A |
| | $I_{iT}$ | 0.94% | 111.5 A | 0.94% | 111.6 A | 0.93% | 113.3 A | 0.96% | 109.7 A |
| Inverter 1 | $I_{gR1}$ | 0.94% | 37.23 A | 0.94% | 37.12 A | 0.93% | 37.83 A | 0.97% | 36.52 A |
| | $I_{gS1}$ | 0.95% | 37.13 A | 0.95% | 37.22 A | 0.93% | 37.86 A | 0.97% | 36.48 A |
| | $I_{gT1}$ | 0.94% | 37.15 A | 0.94% | 37.2 A | 0.93% | 37.76 A | 0.97% | 36.58 A |
| Inverter 2 | $I_{gR2}$ | 0.94% | 37.23 A | 0.94% | 37.12 A | 0.93% | 37.83 A | 0.96% | 36.52 A |
| | $I_{gS2}$ | 0.95% | 37.13 A | 0.94% | 37.22 A | 0.92% | 37.86 A | 0.96% | 36.48 A |
| | $I_{gT2}$ | 0.95% | 37.15 A | 0.94% | 37.2 A | 0.93% | 37.76 A | 0.96% | 36.58 A |
| Inverter 3 | $I_{gR3}$ | 0.95% | 37.23 A | 0.94% | 37.12 A | 0.93% | 37.83 A | 0.96% | 36.52 A |
| | $I_{gS3}$ | 0.94% | 37.13 A | 0.94% | 37.22 A | 0.92% | 37.86 A | 0.96% | 36.48 A |
| | $I_{gT3}$ | 0.95% | 37.15 A | 0.94% | 37.2 A | 0.93% | 37.76 A | 0.96% | 36.58 A |

In sum, the three phase inverting device of the present disclosure can be controlled using a single phase after performing the de-coupling procedure, and complicated procedures (e.g. a abc to dq step) can be omitted when using the dividing procedure and the integrating procedure. Furthermore, through the evaluation result, it is shown that the current of each of the three phases can be precisely controlled, thereby achieving automatic current-sharing in a single phase, and the circulating current can also be reduced. Therefore, the inverting procedures can be dramatically simplified.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A single phase controlling method applied to a three phase inverting device, the three phase inverting device includes a three phase switch, the single phase controlling method comprising:

inputting a DC current into a DC end of the three phase inverting device;

performing a de-coupling procedure to calculate a switching duty ratio using an average value of a voltage between the DC end and a ground of an AC end of the three phase inverting device and generating an electric output of a single phase circuit in accordance with the average value of the voltage and the switching duty ratio;

performing a dividing procedure to divide the electric output of the single phase circuit into two current variations of an inverting end of the three phase inverting device, wherein the two current variations are corresponded to an excitation state and a demagnetization state respectively; and performing an integrating procedure to integrate the two current variations corresponded to the excitation state and the demagnetization state for obtaining another switching duty ratio on a next duty of the three phase switch.

2. The single phase controlling method of claim 1, wherein the three phase inverting device includes a three phase inverting module and a three phase filter module coupled with the three phase inverting module, and the three phase inverting module comprises a plurality of the three phase switches.

3. The single phase controlling method of claim 2, further comprising:

performing the de-coupling procedure, the dividing procedure and the integrating procedure through a controller.

4. The single phase controlling method of claim 1, further comprising:

connecting a plurality of the three phase inverting devices in parallel for forming an inverter parallel system.

5. The single phase controlling method of claim 2, wherein the switching duty ratio of the three phase switch is represented as the following equation:

$$D_{RST} = \frac{(L_{iRST} + L_{gRST})\Delta i_{iRST}}{V_{DC}T_S} + \frac{V_{RSTpn}}{V_{DC}} + \frac{[V_{RSTcN}(t) - 2V_{RSTcN}(t-T_S) + V_{RSTcN}(t-2T_S)]C_{gRST}L_{gRST}}{V_{DC}T_S^2} + \frac{V_{nO}}{V_{DC}};$$

wherein $D_{RST}$ is the switching duty ratio of the three phase switch; $L_{iRST}$ is an inductance $L_i$ value adjacent to the AC end of the three phase filter; $L_{gRST}$ is an inductance $L_g$ value adjacent to the AC end of the three phase filter; $V_{DC}$ is a DC voltage; $T_S$ is a time period; $\Delta i_{iRST}$ is a current variation of the inductance $L_i$ at the three phase inverter end of the three phase filter module; $V_{RSTcN}(t)$ is a voltage of the capacitance relative to the ground N of the AC end of the three phase filter module at an instant cycle; $V_{RsTcN}(t-T_S)$ is a voltage of the capacitance relative to the ground N of the AC end of the three phase filter module at a previous cycle; $V_{RsTcN}(t-2T_S)$ is a voltage of the capacitance relative to the ground N of the AC end of the three phase filter module at a cycle before the previous cycle; $C_{gRST}$ is a capacitance value of the three phase filter module; $L_{gRST}$ is an inductance $L_g$ value at the AC end of the three phase filter module; $\overline{V_{no}}$ is an average voltage between a virtual ground and a ground of an inverter.

6. A three phase inverting device using the single phase controlling method of claim 1, comprising:

a three phase inverter module, wherein the three phase inverter module comprises a plurality of switches, each two of the switches are connected for forming a bridge arm, an input end of each of the bridge arm are coupled for forming a DC end, the DC end is connected to a DC load; and a three phase filter module connected to the three phase inverter module, wherein the three phase filter module comprises a plurality of inductances and a plurality of capacitances, the inductances are connected at one side of the capacitances, a portion of the capacitances are connected to a output end of each of the bridge arm of the three phase inverter module, a portion of the inductances are connected to an AC end.

* * * * *